Patented Aug. 12, 1924.

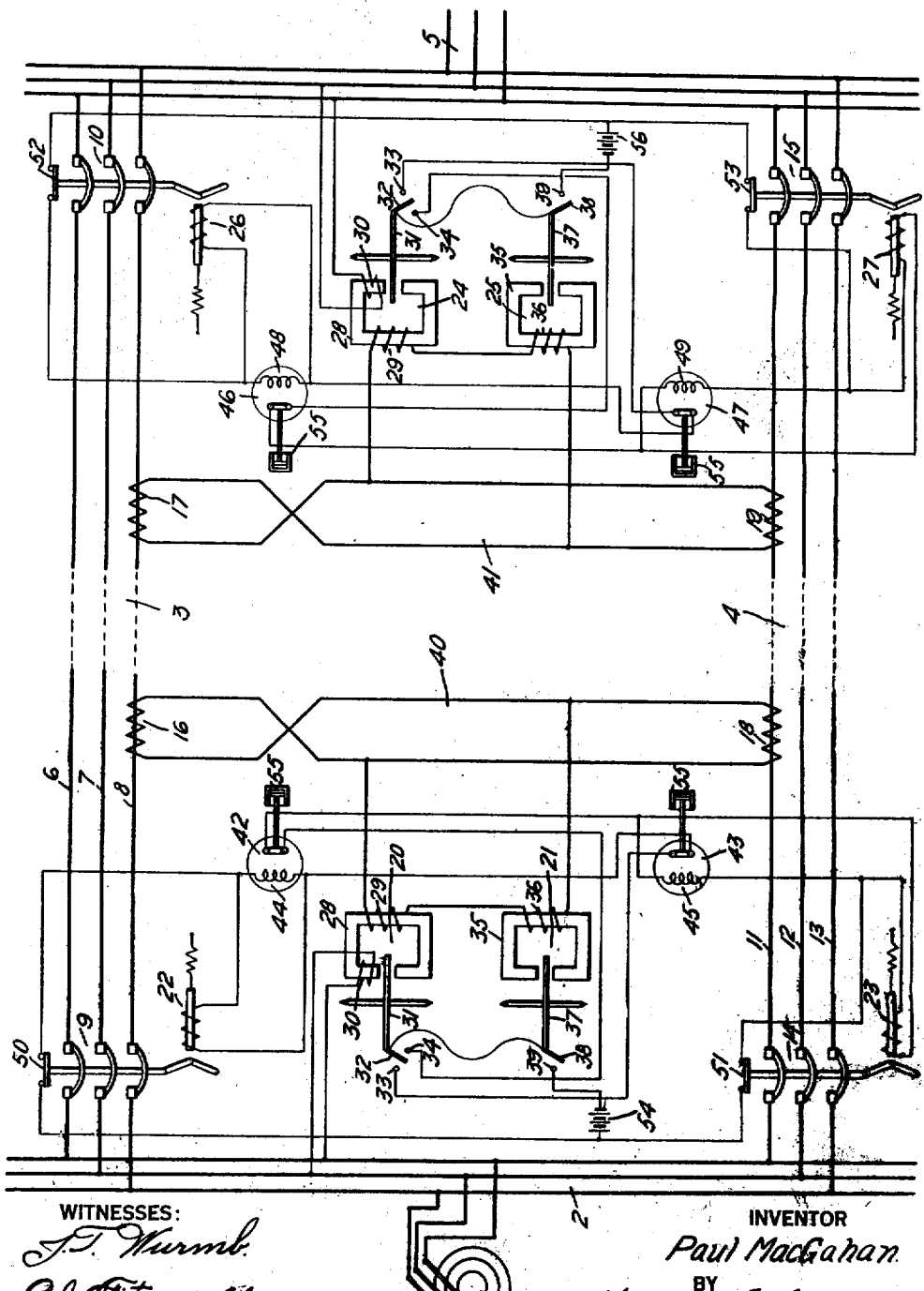

1,504,568

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed December 13, 1917. Serial No. 206,918.

*To all whom it may concern:*

Be it known that I, PAUL MacGAHAN, a citizen of the United States, and a resident of Pittsburgh, in the county of Allegheny and State of Pennsylvania, have invented a new and useful Improvement in Electrical Protective Devices, of which the following is a specification.

My invention relates to electrical protective devices and particularly to means for protecting parallel-connected transmission circuits.

One object of my invention is to provide means for so interlocking the tripping devices of the interrupters at the corresponding ends of parallel-connected transmission circuits that the tripping devices of non-faulty circuits are rendered non-automatic for a sufficient period of time to permit the faulty circuit to be completely disconnected from the system before they function.

Another object of my invention is to provide a system of the above-indicated character that shall be simple and inexpensive to construct and effective in its operation.

Heretofore, it has been the practice to protect parallel-connected circuits by operatively connecting the corresponding ends of the same together and providing relays across the equal-potential points of the connecting means. Such devices are frequently defective because, under some conditions, the interrupters at one end of the circuits may trip before the circuit interrupters at the other end of the faulty circuit, thereby upsetting the selective action of disconnecting only a faulty circuit.

In view of the above, I provide means for so interlocking the tripping devices of the interrupters on the corresponding ends of the circuits that the interrupters of the non-faulty circuits are rendered non-automatic for a sufficient period of time to permit the faulty circuit to be completely disconnected from the system before they are permitted to function. By such an arrangement, the fault in one circuit will not be permitted to incorrectly indicate a faulty condition in the other circuits.

The single figure of the accompanying drawing is a diagrammatic view of an electric circuit embodying my invention.

A generator 1 is connected to bus bars 2 which are connected, through two parallel-connected transmission or feeder circuits 3 and 4, to a load circuit 5.

The transmission circuit 3 comprises three conductors 6, 7 and 8 that are provided with circuit interrupters 9 and 10 at the respective ends thereof. Similarly, the circuit 4 comprises three conductors 11, 12 and 13 that are provided with circuit interrupters 14 and 15 at the respective ends thereof. Current transformers 16 and 17 are operatively connected to the conductor 8 of the circuit 3 at the respective ends thereof, and current transformers 18 and 19 are operatively connected in circuit with the conductor 11 of the circuit 4 at the respective ends thereof. The transformer 16 is so cumulatively connected to the transformer 18 that equal-potential points will obtain across the connecting circuit, and the transformers 17 and 19 are cumulatively connected to provide equal-potential points across the connecting circuit thereof.

A reverse-energy relay 20 and an overload relay 21 are provided for controlling the circuits of the trip coils 22 and 23 of the circuit interrupters 9 and 14, respectively. Similarly, a reverse-energy relay 24 and an overload relay 25 are provided for controlling the circuits of the trip coils 26 and 27 of the circuit interrupters 10 and 15, respectively. The relays 20 and 24 severally comprise a magnetizable core member 28, a current winding 29, a potential winding 30, an armature 31, a movable contact member 32, and stationary contact members 33 and 34. The relays 21 and 25 severally comprise a stationary magnetizable core member 35, a current winding 36, an armature 37, a movable contact member 38 and a stationary contact member 39. The windings 29 and 36 of the relays 20 and 21 are connected in series and the circuit, thus constituted, is connected across equal-potential points of the circuit 40 between the transformers 16 and 18. The windings 29 and 36 of the relays 24 and 25 are connected in series and the circuit, thus constituted, is connected across equal-potential points of the circuit 41 between the transformers 17 and 19. The winding 30 of the relay 20 is connected across two of the bus bars 2, and the winding 30 of the relay 24 is connected in shunt relation to two of the conductors of the load circuit 5. The essential connections of the windings 30 are that one is supplied with potential proportional to the voltage at one end of the circuits 3 and 4 and the other is supplied with potential proportional to the voltage at the other end of the circuits 3 and 4.

Relays 42 and 43, having actuating windings 44 and 45, are provided at one end of the circuits 3 and 4, and relays 46 and 47, having actuating windings 48 and 49, are provided at the other ends of the circuits 3 and 4. The circuit interrupters 9 and 14 are provided with auxiliary switches 50 and 51 and the circuit interrupters 10 and 15 are provided with auxiliary switches 52 and 53, respectively.

The negative terminal of a source 54 of electromotive force is connected to the contact member 39 of the relay 21. The other contact member 38 of the relay 21 is connected to the contact member 32 of the relay 20. The contact member 34 of the relay 20 is connected to one of the contact members of the relay 42 the other contact member of which is connected to one terminal of the winding 45 and to one terminal of the trip coil 23. The other terminal of the trip coil 23 is connected to the other terminal of the winding 45 and the switch 51 is connected between those terminals and the positive terminal of the source 54 of electromotive force. The stationary contact member 33 of the relay 20 is connected to one of the contact members of the relay 43 the other contact member of which is connected to one terminal of the winding 44 of the relay 42 and to one terminal of the trip coil 22. The other terminal of the trip coil 22 is connected to the other terminal of the winding 44 and, through the switch 50, to the positive terminal of the source 54 of electromotive force. The relays 42, 43, 46 and 47 are provided with single-acting dash-pots 55 that permit the contact members to be opened instantaneously, upon the energization of the actuating winding and to be closed within a predetermined interval of time after the windings are de-energized.

The negative terminal of a source 56 of electromotive force is connected to the stationary contact member 39 of the relay 25. The other contact member 38 of the relay 25 is connected to the contact member 32 of the relay 24. The contact member 34 of the relay 24 is connected to one of the contact members of the relay 46. The other contact member of the relay 46 is connected to one terminal of the winding 49 of the relay 47 and to one terminal of the trip coil 27. The other terminal of the winding 49 and of the trip coil 27 are connected, through the switch 53, to the positive terminal of the source 56 of electromotive force. The stationary contact member 33 of the relay 24 is connected to one contact member of the relay 47, the other contact member of which is connected to one terminal of the winding 48 of the relay 46 and to one terminal of the trip coil 26. The other terminal of the trip coil 26 is connected to the other terminal of the winding 48 and, through the switch 52, to one terminal of the source 56 of electromotive force. The movable contact members 32 and 38 of the relays 20 and 21 and 24 and 25, respectively, are electrically connected together.

The relays 44, 45, 46 and 47 are provided for so interlocking the trip coils of the circuit interrupters at the corresponding ends of the circuits that a sufficient interval of time will lapse between the tripping of the interrupters at one end of the circuits to permit the tripping of the corresponding interrupters at the other end of the faulty circuit before the interrupters of the non-faulty circuit are permitted to operate.

When a ground or short circuit obtains on the circuit 3, sufficient unbalanced currents will traverse the circuits 40 and 41 to operate the relays 20 and 24 to cause the movable contact members 32 to engage the stationary contact members 33, and, if the unbalancing is of sufficient value to actuate the relays 21 and 25, the movable contact members 38 will engage the stationary contact members 39 to thus complete a circuit from the sources of electromotive force through the contact members of the relays 43 and 47, the windings 44 and 22 and 48 and 26 and the switches 50 and 52 of the circuit interrupters 9 and 10. Since the trip coils 22 and 26 are connected in shunt relation to the windings 44 and 48, they will be energized, and, since the relays 42 and 46 are adapted to effect disengagement of their contact members instantaneously upon the energization of the windings 44 and 48, the contact members will be opened to thus prevent energization of the trip coils 23 and 27 which might under some conditions otherwise be energized to open the circuit 4. Since the trip coils 23 and 27 cannot be energized, because of the operation of the relays 42 and 46, if the energy reverses in the circuit 4, by reason of the fault in the circuit 3, the reversing of the relays 20 and 24 will not cause the circuit interrupters 14 and 15 to be interrupted. When the interrupters 9 and 10 are tripped, the switches 50 and 52 are opened and, consequently, the circuit through the windings 44 and 48 are interrupted and the contact members of the relays 42 and 46 will re-engage after a predetermined interval of time. This interval of time is such that, if the interrupter 9 is tripped before the interrupter 10, a sufficient interval of time will lapse before the closure of the contact members of the relay 42 to prevent the circuit interrupter 14 from being tripped until the circuit interrupter 10 has been tripped. That is, if the fault in the circuit 3 is such that it causes a condition similar to a fault in the circuit 4, which, in truth, is not a fault, and which would not obtain if the circuit 3 were entirely disconnected from the system, it is advisable to delay the automatic operation of the circuit interrupters 14 and 15 until the circuit 3 is entirely disconnected from the system.

If a fault occurs in the circuit 4, the movable contact members of the relays 20 and 24 will engage the stationary contact members 34, and if the currents traversing the circuits 40 and 41 are of sufficient value, the movable contact members 38 will engage the stationary contact members 39 to complete a circuit through the windings 45 and 49 of the relays 43 and 47 and the trip coils 23 and 27 that are connected in parallel to the windings 45 and 49. Thus, the interrupters 14 and 15 will be tripped and the contact members of the relays 43 and 47 will be so opened that the interrupters 9 and 10 will not be tripped and, when the switches 51 and 53 are opened, the windings 45 and 49 will be de-energized to permit the contact members of the relays 43 and 47 to re-engage after an interval of time which is sufficient to permit both of the interrupters 14 and 15 to be opened before the interrupters 9 and 10 are permitted to be tripped.

It will be understood that, while I have shown only one reverse-energy and one overload relay with respect to each end of the circuits, as many relays of this type as there are phases may be used and the contact members of the same may be connected in parallel to, thus obtain protection on each phase of the circuit.

My invention is not limited to the particular system illustrated, as it is applicable to any number of phases, and various modifications may be made therein without departing from the spirit and scope of the invention, as set forth in the appended claims.

I claim as my invention:

1. The combination with two parallel-connected feeder conductors and automatic circuit interrupters for each end thereof, of means for rendering the interrupters of one feeder conductor non-automatic while the interrupters of the other conductor are being tripped by reason of a fault thereon, comprising a time element relay associated with each feeder conductor, and means controlled by each time element relay for controlling the circuit of the other relay and of the trip coil of the interrupter for the conductor with which the other relay is associated.

2. In a system of distribution, the combination with two parallel-connected feeder conductors and automatic means for disconnecting the same from the system, of means for precluding the possible operation of the automatic disconnecting means of one conductor for a predetermined interval while the other conductor is being disconnected by reason of a fault thereon.

3. In a system of distribution, the combination with two parallel-connected feeder conductors and automatic means for disconnecting the same from the system, of means for precluding for a predetermined interval the operation of the automatic disconnecting means of one conductor when a fault occurs on the other conductor.

4. In a system of distribution, the combination with two parallel-connected feeder conductors and automatic means for disconnecting the same from the system, of means for rendering the automatic disconnecting means of one conductor non-automatic for a predetermined interval of time when a fault occurs on the other conductor.

5. In a system of distribution, the combination with parallel-connected feeder conductors, interrupters for the respective ends of the conductors and automatic means for tripping the interrupters of a conductor when a fault occurs therein, of means for preventing the automatic tripping of the interrupters of another conductor for a sufficient interval of time to permit both interrupters of the faulty conductors to be tripped, comprising a source of control energy, selective means for connecting the tripping means of an interrupter associated with a faulty circuit conductor to said source of energy, and means associated with said tripping means for rendering the selective means ineffective in connecting the other tripping means to the source of energy.

6. In a system of distribution, the combination with parallel-connected feeder conductors, interrupters for the respective ends of the conductors and automatic means for tripping the interrupters of a conductor when a fault occurs therein, of interlocking means between the interrupters at the corresponding ends of the conductors for rendering inoperative the automatic means associated with the interrupters of one conductor until sufficient time has lapsed to permit all the interrupters of a faulty conductor to be tripped, comprising a switch and an operating coil therefor associated with each tripping means and simultaneously energized therewith to open the switch, said switch being in the circuit of the other tripping means.

7. In a system of distribution, the combination with parallel-connected feeder conductors, interrupters for the respective ends of the conductors and automatic means for tripping the interrupters of a conductor when a fault occurs therein, of relays for controlling the tripping of the interrupters in one conductor to preclude any operation thereof until sufficient time has lapsed to permit the interrupters at the respective ends of the faulty conductor to be tripped, comprising a time element relay for each conductor and embodying a switch and an operating coil, means for connecting the operating coil in circuit with the tripping means of the associated interrupter and means for connecting the switch in circuit with the tripping means of the interrupter of another conductor.

8. In a system of distribution, the combination with parallel-connected feeder conductors, interrupters for the respective ends of the conductors and automatic means for tripping the interrupters of a conductor when a fault occurs therein, of relays for controlling the tripping of the interrupters in one conductor to preclude any operation thereof until a predetermined time after the interrupters at the respective ends of the faulty conductor have been tripped.

9. In a system of distribution, the combination with parallel-connected feeder conductors and circuit interrupters for the respective ends thereof provided with trip coils, of means for selectively tripping the interrupters at the respective ends of a faulty conductor and for controlling the tripping of the interrupters of another conductor to preclude such actuation so long as the faulty conductor is connected to the system, comprising a relay associated with each interrupter, each relay being disposed to be simultaneously energized with the trip coil of the associated interrupter and operative to open-circuit the trip coil of another interrupter.

10. In a system of distribution, the combination with two parallel-connected feeder circuits, circuit interrupters at each end thereof and reverse-energy-overload protective devices for controlling the tripping of the same, of time-limit relays controlled by the said protective devices for preventing possible actuation of predetermined interrupters until other predetermined interrupters are tripped.

11. In a system of distribution, the combination with two parallel-connected feeder circuits and interrupters at each end thereof provided with tripping means, of means for disconnecting each end of a faulty circuit, and means for preventing the other circuit from possible actuation until sufficient time has lapsed to permit both ends of the faulty circuit to be disconnected from the system, comprising means selectively operated in response to abnormal conditions in either circuit to energize the tripping means in the faulty circuit and means simultaneously energized therewith to render the selective means ineffective to energize the other tripping means for a predetermined interval of time.

12. In a system of distribution, the combination with parallel-connected feeder circuits, and means for disconnecting one of the circuits from the system when a fault occurs therein, of interlocking means for preventing possible disconnection of another circuit from the system for a predetermined period of time after the faulty circuit is disconnected.

In testimony whereof, I have hereunto subscribed my name this 28th day of Nov., 1917.

PAUL MacGAHAN.